United States Patent
Shin et al.

(10) Patent No.: US 12,505,868 B2
(45) Date of Patent: Dec. 23, 2025

(54) MEMORY DEVICE INCLUDING PAGE BUFFER CIRCUIT

(71) Applicant: SAMSUNG ELECTRONICS CO., LTD., Suwon-si (KR)

(72) Inventors: Jaehue Shin, Suwon-si (KR); Yongsung Cho, Suwon-si (KR); Daeseok Byeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 18/203,754

(22) Filed: May 31, 2023

(65) Prior Publication Data

US 2024/0161790 A1 May 16, 2024

(30) Foreign Application Priority Data

Nov. 11, 2022 (KR) .......................... 10-2022-0150919

(51) Int. Cl.
*G11C 7/10* (2006.01)
*G11C 5/14* (2006.01)
*G11C 7/12* (2006.01)

(52) U.S. Cl.
CPC .............. *G11C 7/1057* (2013.01); *G11C 5/14* (2013.01); *G11C 7/1069* (2013.01); *G11C 7/12* (2013.01)

(58) Field of Classification Search
CPC ................................ G11C 7/1057; G11C 7/12
USPC ....................................................... 365/189.05
See application file for complete search history.

(56) References Cited

U.S. PATENT DOCUMENTS

| | | | |
|---|---|---|---|
| 9,424,928 B2* | 8/2016 | Hwang | ................. G11C 16/10 |
| 9,685,211 B2 | 6/2017 | Park et al. | |
| 10,497,448 B2 | 12/2019 | Arakawa | |
| 10,546,875 B2 | 1/2020 | Kim et al. | |
| 11,101,002 B2 | 8/2021 | Oh et al. | |
| 2018/0137920 A1 | 5/2018 | Song et al. | |
| 2018/0292989 A1* | 10/2018 | Lee | ....................... G06F 3/0659 |
| 2022/0045080 A1 | 2/2022 | Cho et al. | |

FOREIGN PATENT DOCUMENTS

KR 10-2018-0055443 A 5/2018

* cited by examiner

*Primary Examiner* — Anthan Tran
(74) *Attorney, Agent, or Firm* — Sughrue Mion, PLLC (57) ABSTRACT

A memory device includes a memory cell array including a plurality of memory cells, and a page buffer circuit including a plurality of page buffer units respectively connected with the memory cells through a plurality of bit lines. A sensing node is connected to a bit line for each buffer circuit. The plurality of page buffer units are respectively connected with sensing nodes, each of the plurality of page buffer units includes at least one transistor. One or more auxiliary wires in the proximity of the sensing node are used to reduce coupling problems caused by a low capacitance of the sensing node.

20 Claims, 10 Drawing Sheets

MEMORY DEVICE INCLUDING PAGE BUFFER CIRCUIT

CROSS-REFERENCE TO RELATED APPLICATIONS

This application claims priority under 35 U.S.C. § 119 to Korean Patent Application No. 10-2022-0150919 filed on Nov. 11, 2022, in the Korean Intellectual Property Office, the disclosure of which is incorporated by reference herein in its entirety.

BACKGROUND

Embodiments of the present disclosure relate to a memory device, and more particularly, relate to a memory device including a page buffer circuit.

Nowadays, as an information communication device supports various functions, a high-capacity and highly-integrated memory device is required. As the size of a memory cell is reduced for high integration, operating circuits and/or wiring (or interconnection) structures that are included in the memory device for operations and electrical connections of the memory device become more complex. As such, a memory device that provides excellent electrical characteristics while improving the degree of integration of the memory device is required.

The memory device may include a page buffer circuit for storing data in memory cells or outputting data from the memory cells, and the page buffer circuit may include semiconductor elements such as transistors. As the degree of integration of the memory device increases, the reduction of the size of the page buffer circuit may be required. In addition to the demand on the reduction of the size, as process technologies develop, the size of the semiconductor element included in the page buffer circuit may decrease, and the layout of wires connected with the semiconductor elements may become more complicated. Accordingly, there is a need to optimize the layout of wires without the reduction of performance of the memory device.

SUMMARY

One or more embodiments of the present disclosure provide a memory device capable of improving the reliability of sensing of the memory device by changing the layout of wires in a page buffer circuit.

According to an aspect of an example embodiment, a memory device includes: a memory cell array including a plurality of memory cells; and a page buffer circuit including a plurality of page buffer units respectively connected with the plurality of memory cells through a plurality of bit lines, wherein the plurality of page buffer units are respectively connected with a plurality of sensing nodes, wherein each page buffer unit of the plurality of page buffer units includes at least one transistor associated with a first sensing node of the plurality of sensing nodes, and wherein the at least one transistor includes: a source and a drain sequentially disposed in a second direction; a gate electrode disposed between the source and the drain; a plurality of first connection wires extending in a first direction, wherein at least some of the plurality of first connection wires are respectively connected with the source, the drain, and the gate electrode through a plurality of first contacts; a plurality of second connection wires extending in the second direction intersecting the first direction and connected with the first sensing node, wherein the plurality of second connection wires are respectively connected with the plurality of first connection wires through a plurality of second contacts; and a first auxiliary wire extending in the first direction and disposed between adjacent first connection wires.

According to an aspect of an example embodiment, the at least one transistor comprises a first transistor and a second transistor which are connected with the first sensing node and are respectively provided in an N-type active region and a P-type active region.

According to an aspect of an example embodiment, the memory device may further include a second auxiliary wire provided between first connection wires connected to the first transistor and the second transistor from among the plurality of first connection wires and a first connection wire connected in a region between the first transistor and the second transistor from among the plurality of first connection wires.

BRIEF DESCRIPTION OF THE FIGURES

The above and other objects and features of the present disclosure will become apparent by describing in detail embodiments thereof with reference to the accompanying drawings; in which.

DETAILED DESCRIPTION

While the present disclosure is susceptible to various modifications and alternative forms, specific embodiments are shown by way of examples in drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the invention.

Below, embodiments of the present disclosure will be described in detail with reference to the accompanying drawings.

Below, an embodiment of the present disclosure will be described in detail with reference to accompanying drawings.

Figure 1:
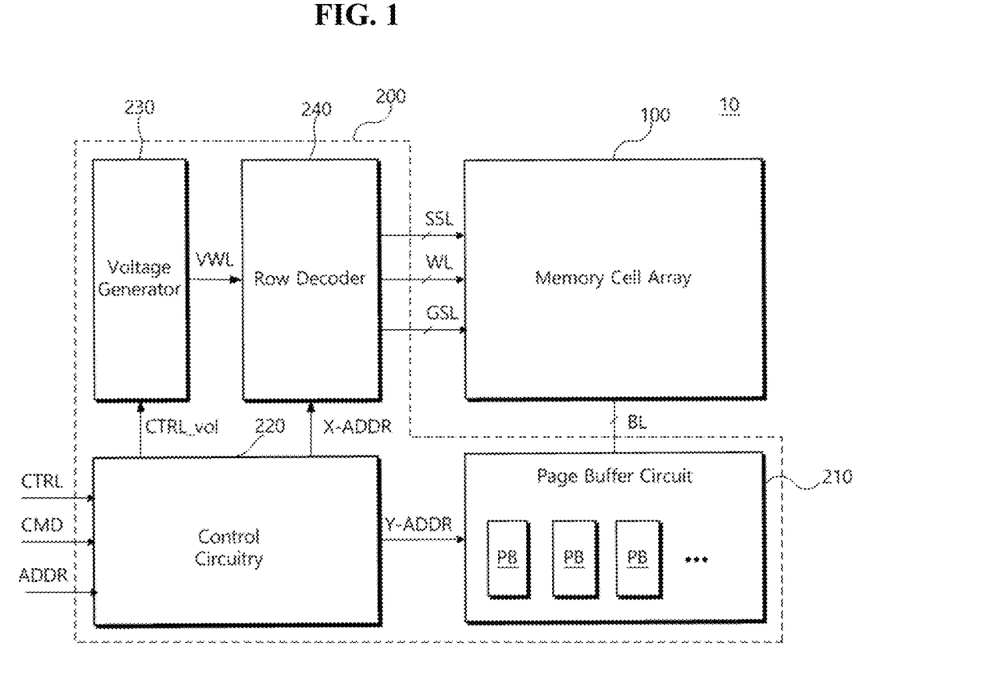
FIG. 1 is a block diagram illustrating a memory device according to an embodiment of the present disclosure.

FIG. 1 is a block diagram illustrating a memory device according to an embodiment of the present disclosure.

Referring to FIG. 1, a memory device 10 may include a memory cell array 100 and a peripheral circuit 200, and the peripheral circuit 200 may include a page buffer circuit 210, a control circuitry 220, a voltage generator 230, and a row decoder 240. Although not illustrated in FIG. 1, the peripheral circuit 200 may further include a data input/output circuit or an input/output interface and the like.

The memory cell array 100 may be connected with the page buffer circuit 210 through bit lines BL and may be connected with the row decoder 240 through word lines WL, string selection lines SSL, and ground selection lines GSL. The memory cell array 100 may include a plurality of memory cells; for example, the memory cells may be flash memory cells. Below, embodiments of the present disclosure will be described in detail with reference to the example in which the plurality of memory cells are NAND flash memory cells. However, the present disclosure is not limited thereto. In some embodiments, the plurality of memory cells may be resistive memory cells such as resistive random access memory (ReRAM) cells, phase change RAM (PRAM) cells, or a magnetic RAM (MRAM) cells.

In an embodiment, the memory cell array 100 may include a three-dimensional memory cell array, which includes a plurality of NAND strings. Each of the NAND strings may include memory cells that are respectively connected with word lines vertically stacked on a substrate. In the memory cell array 100, a three-dimensional memory array may be composed of a plurality of levels, and word lines and/or bit lines may be shared between levels. However, the present disclosure is not limited thereto. In some embodiments, the memory cell array 100 may include a two-dimensional memory cell array, which includes a plurality of NAND strings disposed along row and column directions.

To program data in the memory cell array 100, to read data from the memory cell array 100, or to erase data present in the memory cell array 100, the control circuitry 220 may output various kinds of control signals, for example, a voltage control signal CTRL_vol, a row address X-ADDR, and a column address Y-ADDR, based on a command CMD, an address ADDR, and a control signal CTRL. As such, the control circuitry 220 may overall control various kinds of internal operations of the memory device 10.

The voltage generator 230 may generate various kinds of voltages for performing the program, read, and erase operations with respect to the memory cell array 100, based on the voltage control signal CTRL_vol. In detail, the voltage generator 230 may generate a word line voltage VWL, for example, a program voltage, a read voltage, a pass voltage, an erase verify voltage, or a program verify voltage. Also, the voltage generator 230 may further generate a string selection line voltage and a ground selection line voltage based on the voltage control signal CTRL_vol.

In response to the row address X-ADDR, the row decoder 240 may select one of a plurality of memory blocks, may select one of the word lines WL in the selected memory block, and may select one of the plurality of string selection lines SSL. The page buffer circuit 210 may select some of the bit lines BL in response to the column address Y-ADDR.

In detail, the page buffer circuit 210 operates as a write driver or a sense amplifier depending on an operating mode.

The page buffer circuit 210 may include a plurality of page buffers PB respectively connected with the plurality of bit lines BL. In an embodiment, page buffer units PBU respectively included in the plurality of page buffers PB and cache units CU respectively included in the plurality of page buffers PB may be spaced from each other to have a separated structure. As such, the degree of freedom of wires disposed over the page buffer units may be improved, and the complexity of the layout may decrease. Also, because the cache units are disposed adjacent to data input/output lines, a distance between the cache units and the data input/output lines decreases, and thus, a data input/output speed may be improved.

In an embodiment, a sensing node of each page buffer unit may be implemented by using a plurality of metal layers disposed in vertical and horizontal directions, and thus, a capacitance of the sensing node may increase. In the specification, a "metal layer" or a "metal pattern" that has conductivity may refer to a "conductive layer" or a "conductive pattern" and may not be limited to a metal material.

In an embodiment, a metal pattern that is biased with a constant voltage may be disposed adjacent to a metal pattern where a sensing node is implemented. The metal pattern may be provided in a specific layer when the connection of a wire with an adjacent transistor is made. The metal pattern may be provided in the form of shielding metal patterns to which a power supply voltage or a ground voltage is applied, that is, in the form of shielding lines. Accordingly, the coupling with an adjacent sensing node may be prevented. In addition, as a metal pattern biased with a constant voltage is disposed adjacent to the metal pattern where the sensing node is implemented, the capacitance of the sensing node may increase, and thus, a couple ratio with an adjacent wire(s) may decrease. As a result, while the memory device 10 operates, a voltage variation of the sensing node may decrease, and thus, the reliability of the memory device 10 may be improved. This will be described in detail later.

Figure 2:
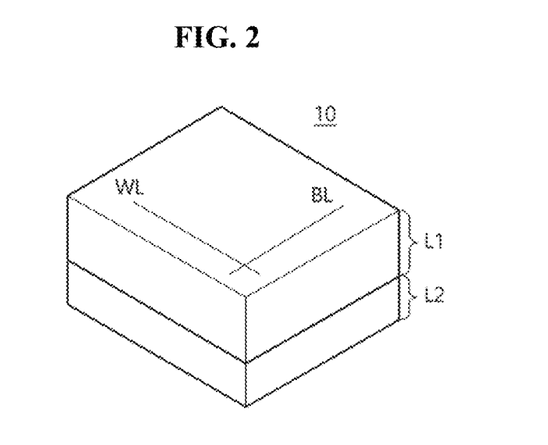
FIG. 2 is a diagram illustrating a structure of a memory device, according to an embodiment of the present disclosure.

FIG. 2 is a diagram illustrating a structure of a memory device, according to an embodiment of the present disclosure.

Referring to FIGS. 1 and 2, the memory device 10 may include a first semiconductor layer L1 and a second semiconductor layer L2, and the first semiconductor layer L1 may be stacked in a vertical direction perpendicular to the second semiconductor layer L2. In detail, the second semiconductor layer L2 may be disposed under the first semiconductor layer L1 in the vertical direction, and thus, the second semiconductor layer L2 may be disposed close to the substrate.

In an embodiment, the memory cell array 100 of FIG. 1 may be formed in the first semiconductor layer L1, and the peripheral circuit 200 of FIG. 1 may be formed in the second semiconductor layer L2. That is, the memory device 10 may have a structure in which the memory cell array 100 is disposed over the peripheral circuit 200, that is, a cell over periphery (COP) structure. The COP structure may effectively reduce the area in the horizontal direction and may improve the degree of integration of the memory device 10.

In an embodiment, the second semiconductor layer L2 may include the substrate, and the peripheral circuit 200 may be formed in the second semiconductor layer L2 by forming a plurality of transistors and a plurality of metal patterns on the substrate. The first semiconductor layer L1 including the memory cell array 100 may be formed independently of the peripheral circuit 200 in the second semiconductor layer L2, and metal patterns for electrically connecting the word lines WL and the bit lines BL of the memory cell array 100 and the peripheral circuit 200 formed in the second semiconductor layer L2 may be formed. For example, the bit lines BL may extend in a first horizontal direction HD1 (refer to FIG. 4), and the word lines WL may extend in a second horizontal direction HD2 (refer to FIG. 4).

Figure 3:
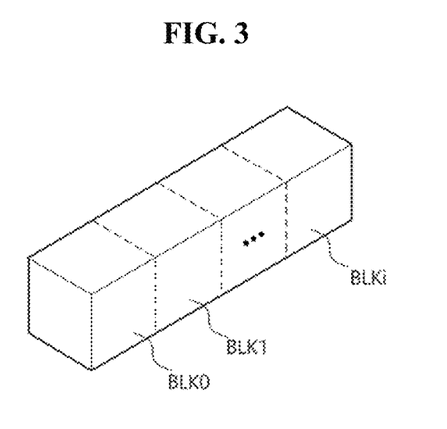
FIG. 3 is a diagram illustrating a memory cell array of FIG. 1, according to an embodiment of the present disclosure.

FIG. 3 is a diagram illustrating a memory cell array of FIG. 1, according to an embodiment of the present disclosure.

Referring to FIG. 3, the memory cell array 100 may include a plurality of memory blocks BLK0 to BLKi. Herein, the "i" may be a positive integer. Each of the plurality of memory blocks BLK0 to BLKi may have a three-dimensional structure (or a vertical structure). In detail, each of the plurality of memory blocks BLK0 to BLKi may include a plurality of NAND strings extending in the vertical direction VD. In this case, the plurality of NAND strings may be provided to be spaced from each other in a specific direction (e.g., a horizontal direction) as much as a specific distance. The plurality of memory blocks BLK0 to BLKi may be selected by the row decoder 240 (refer to FIG. 1). For example, the row decoder 240 may select a memory block corresponding to a block address from among the plurality of memory blocks BLK0 to BLKi.

Figure 4:
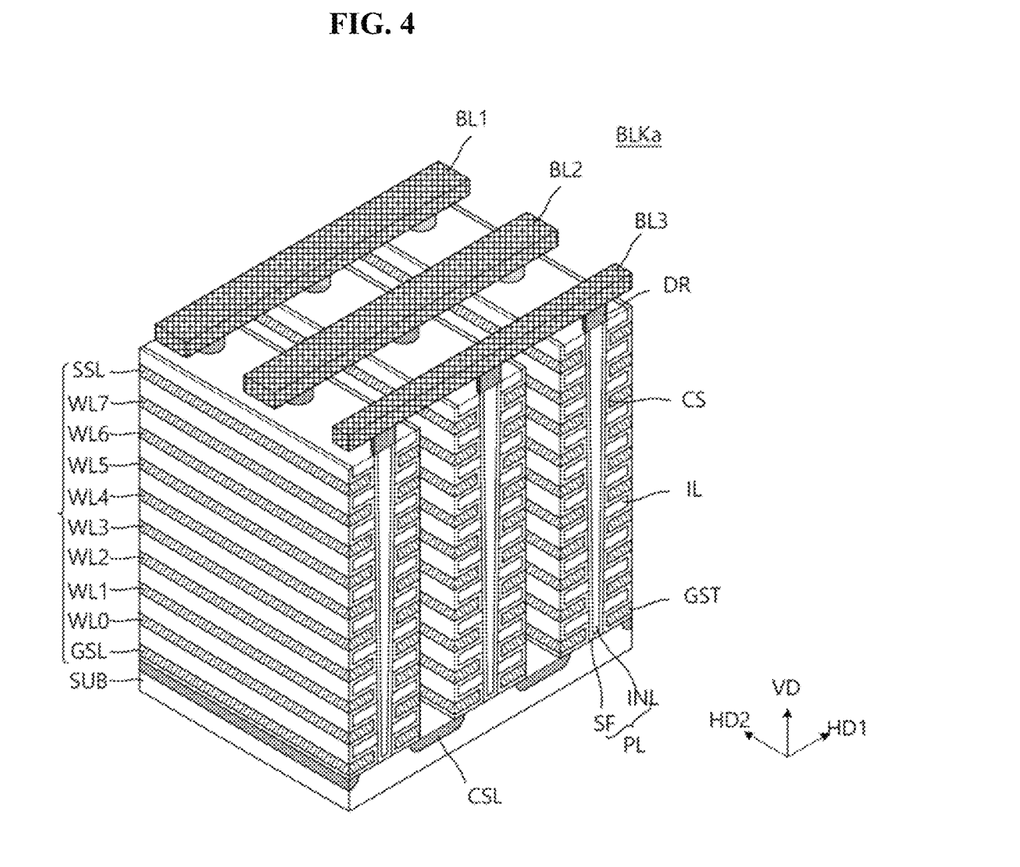
FIG. 4 is a perspective view illustrating a memory block of FIG. 3, according to an embodiment of the present disclosure.

FIG. 4 is a perspective view illustrating a memory block BLKa of FIG. 3, according to an embodiment of the present disclosure.

Referring to FIG. 4, the memory block BLKa may be formed in a direction perpendicular to a substrate SUB. The substrate SUB is of a first conductivity type (e.g., a p-type), and a common source line CSL that extends along the second horizontal direction HD2 and is doped with dopants (or impurities) of a second conductivity type (e.g., an n-type) is provided on the substrate SUB. On a region of the substrate SUB between two adjacent common source lines CSL, a plurality of insulating layers IL that extend along the second horizontal direction HD2 are sequentially provided along the vertical direction VD. The plurality of insulating layers IL are spaced apart from each other along the vertical direction VD as much as a specific distance. For example, each of the plurality of insulating layers IL may include an insulating material such as silicon oxide.

A plurality of pillars PL that are sequentially disposed along the first horizontal direction HD1 and penetrate the plurality of insulating layers IL along the vertical direction VD are provided on the region of the substrate SUB between the two adjacent common source lines CSL. For example, the plurality of pillars PL may be in contact with the substrate SUB through the plurality of insulating layers IL. In detail, a surface layer SF of each pillar PL may include a silicon material of a first type and may function as a channel region. Meanwhile, an inner layer INL of each pillar PL may include an insulating material such as silicon oxide or an air gap. In the region between the two adjacent common source lines CSL, a charge storage layer CS may be provided along exposed surfaces of the insulating layers IL, the pillars PL, and the substrate SUB. The charge storage layer CS may include a gate insulating layer (or referred to as a "tunneling insulating layer"), a charge trap layer, and a blocking insulating layer. For example, the charge storage layer CS may have an oxide-nitride-oxide (ONO) structure. Also, in the region between the two adjacent common source lines CSL, gate electrodes such as the selection lines GSL and SSL and the word WL0 to WL7 may be provided on an exposed surface of the charge storage layer CS.

Drains or drain contacts DR may be respectively provided on the plurality of pillars PL. For example, each of the drains or drain contacts DR may include a silicon material which is doped with dopants of the second conductivity type. The bit lines BL1 to BL3 that extend in the first horizontal direction HD1 and are spaced from each other along the second horizontal direction HD2 as much as a specific distance may be provided on the drains DR FIG. 5 is a diagram illustrating a memory cell array and a page buffer unit, according to an embodiment of the present disclosure.

Figure 5:
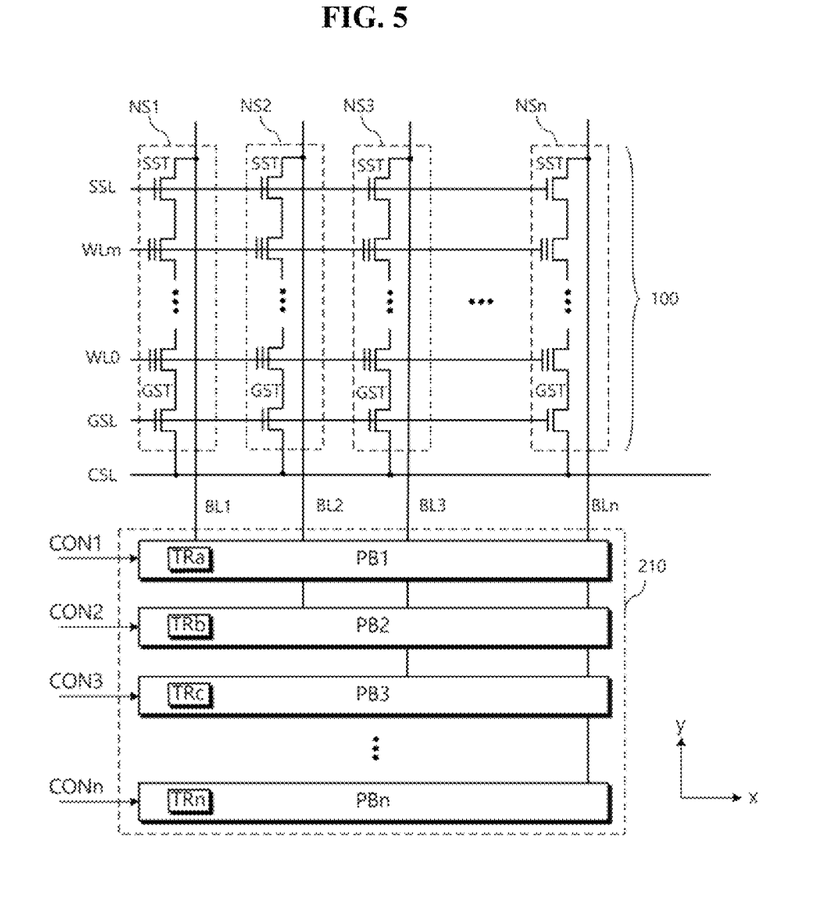
FIG. 5 is a diagram illustrating a memory cell array and a page buffer unit according to an embodiment of the present disclosure.

Referring to FIG. 5, the memory cell array 100 may include first to n-th NAND strings NS1 to NSn, and a page buffer unit PBU may include first to n-th page buffers PB1 to PBn. The first page buffer PB1 may be connected with the first NAND string NS1 through the first bit line BL1, the second page buffer PB2 may be connected with the second NAND string NS1 through the second bit line BL2, and the n-th page buffer PBn may be connected with the n-th NAND string NSn through the n-th bit line BLn.

In an embodiment, the first to n-th page buffers PB1 to PBn may be adjacent to each other along a given direction (e.g., an y-axis direction). As such, the first page buffer PB1 may be first most adjacent to the memory cell array 100, and the second page buffers PB2 may be second most adjacent to the memory cell array 100. In other words, locations of the first to n-th page buffers PB1 to PBn in a given direction may be differently disposed. This may mean that distances from the memory cell array 100 to the first to n-th page buffers PB1 to PBn are different from each other.

The first to n-th page buffers PB1 to PBn may respectively include first to n-th transistors TRa to TRn performing the same relevant function. In detail, in the read and write operation for memory cells included in the memory cell array 100, the first to n-th transistors TRa to TRn may respectively perform the same relevant functions in the first to n-th page buffers PB1 to PBn. In this case, the first to n-th transistors TRa to TRn may be referred to as "transistors for the same purpose".

The first to n-th transistors TRa to TRn may be independently driven by first to n-th control signals CON1 to CONn corresponding thereto. The first to n-th control signals CON1 to CONn may be received from control logic (e.g., 140 of FIG. 1). In an embodiment, in a period where the first to n-th page buffers PB1 to PBn are activated, the first to n-th control signals CON1 to CONn may have the same voltage level. However, the present disclosure is not limited thereto. In some embodiments, in at least a partial time period of the period where the first to n-th page buffers PB1 to PBn are activated, the first to n-th control signals CON1 to CONn may have different voltage levels.

As described above, a memory device according to an embodiment includes a memory cell array including a plurality of memory cells and a page buffer circuit including a plurality of page buffer units respectively connected with the memory cells through a plurality of bit lines. Each of the plurality of page buffer units includes at least one transistor. Each of the plurality of page buffer units is connected with each sensing node and is driven.

In an embodiment, a transistor and a connection pattern (hereinafter referred to as a "transistor pattern") connected with the transistor may have a structure for increasing the degree of freedom of wire arrangement by removing a hammer pattern, decreasing the coupling between adjacent wires in a page buffer unit, and increasing a capacitance of a sensing node. Below, the structure will be first described, and the page buffer unit adopting the transistor will be then described in detail.

According to the related art, the area of page buffers has been decreased by reducing the number of page buffer layers (e.g., from 16 page buffer layers to 12 page buffer layers or 8 page buffer layers). However, the decrease in the number of page buffer layers inevitably accompanies the decrease in the number of metal wires constituting a page buffer; in this case, as the height of the page buffer decreases, a length of a metal wire constituting a sensing node in the page buffer also decreases. The decrease in the length of the metal wire constituting the sensing node causes the decrease in a capacitance of the sensing node in the page buffer.

For example, a sensing node (SO) develop operation in which a voltage level of the sensing node has a high-to-low transition may be performed during a sensing operation. In the case where the sensing node is sensitive to the coupling due to the decrease in the capacitance of the sensing node, when the voltage level of the sensing node SO transitions to the low level, a gate voltage of a transistor disposed adjacent to the sensing node SO may be down coupled together. For example, a gate voltage of a transistor to which a bit line shut-off signal BLSHF, a bit line connection control signal CLBLK, or a bit line clamping signal BLCLAMP_ALL is provided may be down coupled together with the voltage level of the sensing node SO. In this case, the gate voltage of the transistor to which the bit line shut-off signal BLSHF, the bit line connection control signal CLBLK, or the bit line clamping signal BLCLAMP_ALL is provided may be lower than a target voltage, which affects the sensing node develop operation. In detail, there occurs the reduction of performance: the voltage level of the sensing node does not sufficiently decrease or a sensing node develop time increases.

However, because a metal wire in the page buffer is used for routing between transistors or as a signal wire/power wire, it is not easy to utilize the metal wire as a metal capacitor electrode for increasing the capacitance of the sensing node. Also, a way to increase the capacitance of the sensing node through a transistor capacitor may accompany the increase in the area of the page buffer.

According to an embodiment of the present disclosure, the above issue is overcome by disposing a metal wire (e.g., a first connection wire), which extends to be perpendicular to a direction (hereinafter referred to as a "sequential arrangement direction") in which the source, the drain, and the gate electrode of the transistor are sequentially stacked, and a sensing node in a direction identical to the sequential arrangement direction of the source, the drain, and the gate electrode of the transistor. In particular, the metal wire that is perpendicular to the sequential arrangement direction of the source, the drain, and the gate electrode of the transistor being a component of the page buffer may be used for the routing between transistors through an additional upper wire (e.g., a second connection wire) connected through a contact such that a hammer pattern is not provided just on/over the gate electrode.

However, in the case where the metal wire (e.g., the first connection wire) is implemented to be perpendicular to the arrangement direction of the source, the drain, and the gate electrode of the transistor such that the hammer pattern is not provided just on/over the source, the drain, and the gate electrode, the transition of the sensing node may be made during a sensing operation for determining whether a memory cell is turned on/off by monitoring a cell current, which causes the down coupling between the source and the gate electrode of the transistor. In other words, in the case where a gate voltage level changes while sensing an analog signal in the page buffer, the reduction of performance may occur. To prevent this issue, according to an embodiment of the present disclosure, a fixed voltage such as a power supply voltage or a ground voltage is connected with the metal wire, and thus, the coupling is prevented through the metal wire acting as a shield wire. In this case, an additional metal wire (e.g., a first and/or second auxiliary wire as the same metal wire as the first connection wire) is disposed in a region between a P-type active region and an N-type active region or in an active region, in which a transistor is not provided, from among the P-type active region and the N-type active region, and the additional metal wire is utilized as a capacitor electrode by applying a fixed bias (e.g., a ground voltage or a power supply voltage) to the additional metal wire. According to an embodiment of the present disclosure, the metal wires that are used as a capacitor electrode may be disposed to cross each other, and thus, the sensing node coupling between adjacent page buffers may be prevented.

Below, a transistor pattern for implementing the above configuration and a page buffer including the transistor pattern will be described in detail.

Figure 6A:
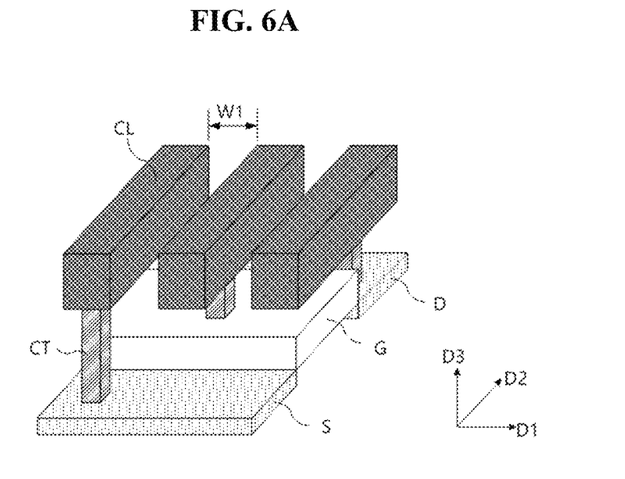
FIGS. 6A to 6C are views illustrating transistor patterns of a page buffer region according to the related art and the present disclosure.
Figure 6B:
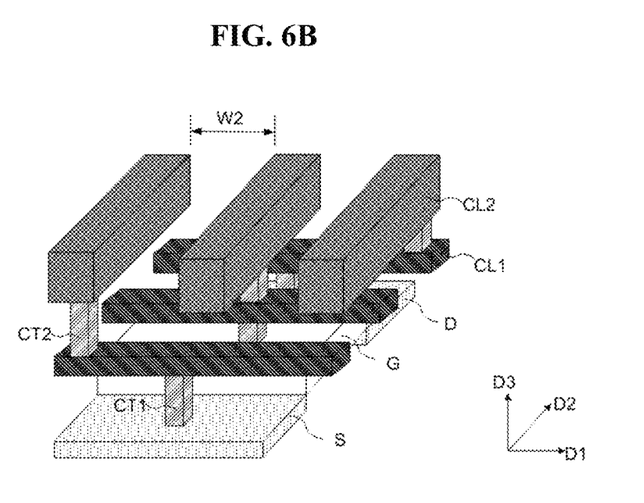
Figure 6C:
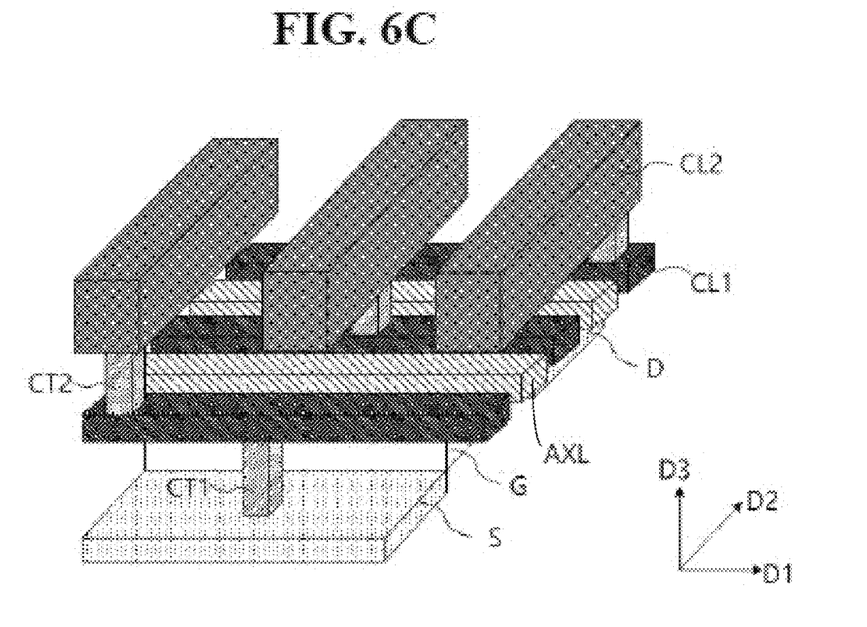

FIGS. 6A to 6C are views illustrating transistor patterns of a page buffer region.

Referring to FIGS. 6A to 6C, a transistor including a gate electrode "G", a source "S", and a drain "D" is provided on a substrate (not illustrated).

The substrate may include a single crystal silicon layer, a silicon on insulator (SOI), a silicon layer formed on a silicon germanium (SiGe) layer, a single crystal silicon layer formed on an insulating layer, a polysilicon layer formed on an insulating layer, etc. and may have the first conductivity type (e.g., p-type).

The source "S" and the drain "D" are formed by doping a portion of the substrate with dopants (or impurities) of the second conductivity type (e.g., n-type). A gate insulating layer (not illustrated) may include, for example, silicon oxide, oxynitride, or nitrided oxide, depending on various embodiments of the present disclosure. The gate electrode "G" is provided to be spaced from the source "S" and the drain "D", with the gate insulating layer interposed therebetween. The gate electrode "G" may be made of metal or polysilicon.

The source "S", the drain "D", and the gate electrode "G" may be provided in the shape of extending along a first direction D1 (e.g., a transverse direction) and may be sequentially arranged along a second direction D2 (e.g., a longitudinal direction) intersecting the first direction. A direction intersecting the first direction D1 and the second direction D2 is a third direction D3 (e.g., a direction perpendicular to the first and second directions D1 and D2). Herein, the first to third directions D1, D2, and D3 refer to specific directions when viewed as a whole. The specific direction may be the x-axis direction or the y-axis direction described above. However, the specific direction may be a direction different from the x-axis direction or the y-axis direction, and the present disclosure is not limited thereto. Also, the expression "a specific component extends in the first direction" includes the case where the specific component extends in the specific direction, when viewed as a whole, even though a portion of the specific component extends in another direction, as well as the case where the specific component extends only in the first direction.

Referring to FIG. 6A, a connection wire CL that connects the transistor with any other component is connected with each of the gate electrode "G", the source "S", and the drain "D".

The connection wires CL are connected with the gate electrode "G", the source "S", and the drain "D" through contacts connected therewith, with an insulating layer interposed therebetween. The connection wires CL are disposed on the upper side of the gate electrode "G", the source "S", and the drain "D" so as to extend in the second direction. The connection wires CL may be provided on the contacts, when viewed on the cross section taken in the first direction, so as to have a width greater than a width of the contacts; in this case, the connection wires CL may have a hammer pattern of a hammer shape. However, in consideration of the size of the transistor, that is, a region where the gate electrode "G", the source "S", and the drain "D" are disposed, an interval in the second direction in which the gate electrode "G", the source "S", and the drain "D" are arranged is narrow. In the case where the connection wires CL having the hammer pattern of a relatively great width are disposed on the upper side of the gate electrode "G", the source "S", and the drain "D", a space in which the connection wires CL are disposed is narrow; in this case, the degree of freedom of wire arrangement is low, and the probability that a defective connection occurs is high.

FIG. 6B shows how to form connection wires of a multi-layer structure to allow the arrangement of hammer patterns to be easy in the transistor pattern illustrated in FIG. 6A.

Referring to FIG. 6B, connection wires include first connection wires CL1 connected with the gate electrode "G", the source "S", and the drain "D" through first contacts CT1, and second connection wires CL2 respectively connected with the first connection wires CL1 through second contacts CT2. Herein, the first connection wires CL1 connected with the gate electrode "G", the source "S", and the drain "D" are disposed to extend along the first direction, not the second direction; the second connection wires CL2 are disposed to extend along the second direction. In a state where the first connection wires CL1 extend along the first direction, the second connection wires CL2 are connected with the first connection wires CL1 through the second contacts CT2 such that the connections of the first connection wires CL1 and the second connection wires CL2 are made at appropriate locations of extensions of the first connection wires CL1 with a sufficient interval. According to the above layout, an interval W2 between connection wires of FIG. 6B may be formed to be wider than an interval W1 between connection wires of FIG. 6A. This means that the degree of freedom of disposing connection wires in the narrow region on the transistor increases.

According to the layout of FIG. 6B, the capacitive coupling may occur between the first connection wire CL1 and the gate electrode "G" adjacent to each other and/or between the first connection wire CL1 and a connection wire CL adjacent to each other; in this case, the performance of device may be reduced. According to the present disclosure, a first auxiliary wire for preventing the capacitive coupling may be added.

FIG. 6C shows a first auxiliary wire added as a shield wire being a component for preventing the coupling capable of occurring in the transistor pattern illustrated in FIG. 6B.

Referring to FIG. 6C, at least one first auxiliary wire AXL may be provided between the first connection wires CL1 adjacent to each other. The first auxiliary wire AXL may extend in the first direction, may be spaced from the first connection wires CL1 adjacent thereto, and may be disposed parallel to the first connection wires CL1.

In an embodiment, the first auxiliary wire AXL may be provided in the same layer as the first connection wires CL1. The first auxiliary wire AXL may be formed independently of the first connection wires CL1; however, the first auxiliary wire AXL may be formed together with the first connection wires CL1 in the process of forming the first connection wires CL1, that is, in the same step/process. For example, the first connection wires CL1 and the first auxiliary wire AXL may be manufactured by forming a conductive layer and patterning the conductive layer; in this case, the first connection wires CL1 and the first auxiliary wire AXL may be patterned and formed from the same layer, that is, the conductive layer.

In an embodiment, the first auxiliary wire AXL may be biased by a constant voltage. For example, a power supply voltage Vdd or a ground voltage GND may be applied to the first auxiliary wire AXL. Through this, the capacitance of the connecting wires CL1 increases, so that gate voltages of nearby transistors are not affected when the sensing node SO transitions to a lower value.

According to an embodiment of the present disclosure, a page buffer may include a transistor with the above structure. Below, a page buffer circuit will be first described, and then, a detailed structure in which the page buffer circuit is implemented will be described.

Figure 7:
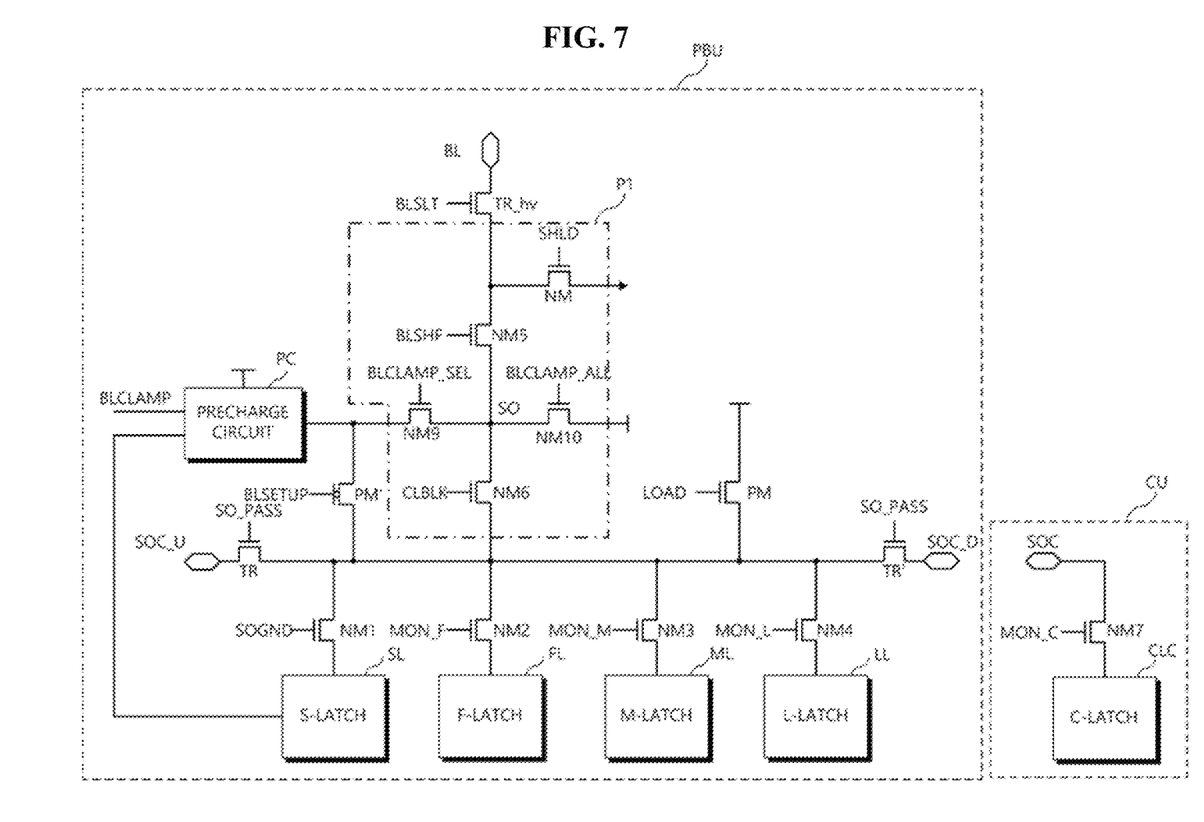
FIG. 7 is a circuit diagram of a page buffer circuit according to an embodiment of the present disclosure.

FIG. 7 is a circuit diagram of a page buffer circuit according to an embodiment of the present disclosure.

Referring to FIG. 7, the page buffer PB may include the page buffer unit PBU and a cache unit CU. The cache unit CU may include a cache latch (C-LATCH) CLC. Because the cache latch CLC is connected with a data input/output line, the cache unit CU may be disposed adjacent to the data input/output line. As such, the page buffer unit PBU and the cache unit CU may be disposed to be spaced from each other, and the page buffer PB may have a structure in which the page buffer unit PBU and the cache unit CU are separated from each other.

The page buffer unit PBU may include a bit line selection transistor TR_hv that is connected with the bit line BL and is driven by a bit line selection signal BLSLT. The bit line selection transistor TR_hv may be implemented with a high-voltage transistor, and the bit line selection transistor TR_hv may be disposed in a well region different from that of a main unit MU.

The page buffer unit PBU may include a sensing latch (S-LATCH) SL, a force latch (F-LATCH) FL, an upper bit latch (M-LATCH) ML, and a lower bit latch (L-LATCH) LL. According to an embodiment, the sensing latch SL, the force latch FL, the upper bit latch ML, or the lower bit latch LL may be referred to as a "main latch". The main unit MU may include a precharge circuit PC that controls a precharge operation for the bit line BL or the sensing node SO based on a bit line clamping control signal BLCLAMP and may further include a transistor PM' that is driven by a bit line setup signal BLSETUP.

In the read operation or the program verify operation, the sensing latch SL may store a result of sensing data stored in a memory cell or a threshold voltage of the memory cell. Also, in the program operation, the sensing latch SL may be utilized to apply a program bit line voltage or a program inhibition voltage to the bit line BL. The force latch FL may be utilized to improve a threshold voltage distribution in the program operation. The upper bit latch ML, the lower bit latch LL, and the cache latch CLC may be utilized to store data received from the outside in the program operation and may also be referred to as a "data latch". In the case of programming 3-bit data in one memory cell, the three data bits may be respectively stored in the upper bit latch ML, the lower bit latch LL, and the cache latch CLC. The data read from the memory cell in the read operation may be dumped from the sensing latch SL to the cache latch CLC, and the cache latch CLC may output the dumped data to the outside through the data input/output line.

The main unit MU may further include first to fourth transistors NM1 to NM4. The first transistor NM1 may be connected between the sensing node SO and the sensing latch SL and may be driven by a ground control signal GOGND. The second transistor NM2 may be connected between the sensing node SO and the force latch FL and may be driven by a force monitoring signal MON_F. The third transistor NM3 may be connected between the sensing node SO and the upper bit latch ML and may be driven by an upper bit monitoring signal MON_M. The fourth transistor NM4 may be connected between the sensing node SO and the lower bit latch LL and may be driven by a lower bit monitoring signal MON_L.

The main unit MU may further include fifth and sixth transistors NM5 and NM6 connected in series between the bit line selection transistor TR_hv and the sensing node SO. The fifth transistor NM5 may be driven by the bit line shut-off signal BLSHF, and the sixth transistor NM6 may be driven by the bit line connection control signal CLBLK. The main unit MU may further include a precharge transistor PM. The precharge transistor PM is connected with the sensing node SO, is driven by a load signal LOAD, and precharges the sensing node SO with a precharge level in a precharge period. In an embodiment, the main unit MU may further include a pair of pass transistors connected with the sensing node SO, that is, first and second pass transistors TR and TR'. In an embodiment, the first and second pass transistors TR and TR' may also be referred to as "first and second sensing node connection transistors". The first and second pass transistors TR and TR' may be driven by a pass control signal SO_PASS. According to an embodiment, the pass control signal SO_PASS may also be referred to as a "sensing node connection control signal". The first pass transistor TR may be connected between a first terminal SOC_U and the sensing node SO, and the second pass transistor TR' may be connected between the sensing node SO and a second terminal SOC_D.

The page buffer unit PBU may further include a transistor PM'' connected with the sensing latch SL, an eighth transistor NM8 driven by a bit line ground signal BLGND, a ninth transistor NM9 driven by the bit line clamping selection signal BLCLAMP_SEL, a tenth transistor NM10 driven by a bit line clamping signal BLCLAMP_ALL, and a transistor NM driven by a shielding signal SHLD.

In the program operation, the page buffer PB verifies whether a memory cell selected from memory cells included in a NAND string connected with the bit line BL is completely programmed. In detail, in the program verify operation, the page buffer PB stores the data sensed through the bit line BL in the sensing latch SL. The upper bit latch ML and the lower bit latch LL in which the target data are stored are set depending on the sensed data stored in the sensing latch SL. For example, when the sensed data indicate that the selected memory cell is completely programmed, the upper bit latch ML and the lower bit latch LL are set such that the selected memory cell is program-inhibited in a next program loop. The cache latch CLC may temporarily store input data provided from the outside. In the program operation, the target data present in the cache latch CLC stored in the cache latch CLC may be stored in the upper bit latch ML and the lower bit latch LL.

Figure 8:
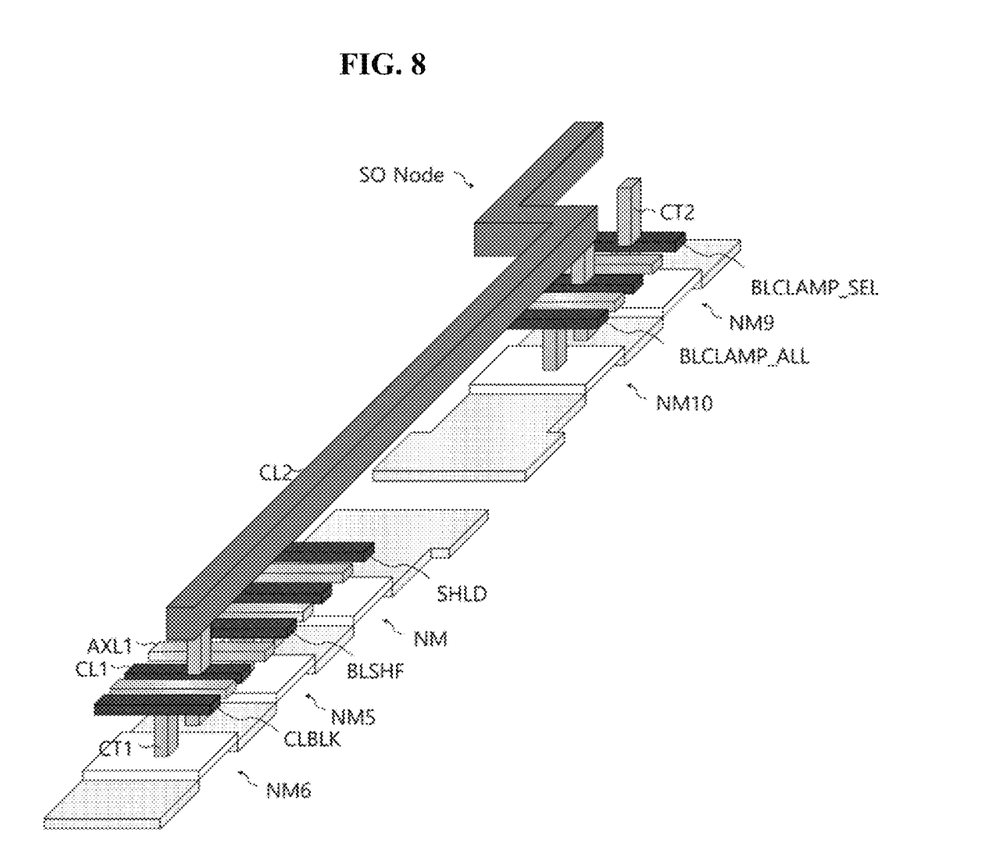
FIG. 8 is a perspective view illustrating a configuration of implementing a portion P1 of a circuit of FIG. 7.

FIG. 8 is a perspective view illustrating a configuration of implementing a portion P1 of a circuit of FIG. 7. In FIG. 8, for convenience of description, some wires are omitted, and only some wires are illustrated. It is obvious that transistors may be differently arranged without departing from the scope and spirit of the invention.

Referring to FIG. 8, a page buffer circuit includes the sixth transistor NM6 driven by the bit line connection control signal CLBLK, the fifth transistor NM5 driven by the bit line shut-off signal BLSHF, the transistor NM driven by the shielding signal SHLD, the tenth transistor NM0 driven by the bit line clamping control signal BLCLAMP, and the ninth transistor NM9 driven by the bit line clamping selection signal BLCLAMP_SEL.

The sixth transistor NM6 driven by the bit line connection control signal CLBLK, the fifth transistor NM5 driven by the bit line shut-off signal BLSHF, the transistor NM driven by the shielding signal SHLD, the tenth transistor NM10 driven by the bit line clamping control signal BLCLAMP, and the ninth transistor NM9 driven by the bit line clamping selection signal BLCLAMP_SEL may be disposed in various shapes. However, as illustrated, the transistors NM6, NM5, NM, NM10, and NM9 may be sequentially disposed along one direction, in particular, the second direction.

The first connection wires CL1 extending along the first direction may be connected with gate electrodes of the transistors NM6, NM5, NM, NM10, and NM9 through the first contacts CT such that driving signals are respectively applied to the transistors NM6, NM5, NM, NM10, and NM9. The second connection wire CL2 extending along the second direction may be connected with the first connection wire(s) CL1 through the second contact(s) CT2. An embodiment in which connection wires are formed on two layers and include the first connection wires CL1 and the second connection wires CL2 is illustrated, which is provided as an example; in another embodiment, the second connection wires CL2 may be connected with third connection wires extending along the first direction or the second direction through contacts.

Herein, the sixth transistor NM6 driven by the bit line connection control signal CLBLK, the fifth transistor NM5 driven by the bit line shut-off signal BLSHF, the transistor NM driven by the shielding signal SHLD, the tenth transistor NM10 driven by the bit line clamping control signal BLCLAMP, and the ninth transistor NM9 driven by the bit line clamping selection signal BLCLAMP_SEL are formed to be larger in size than the remaining transistors; in this case, the probability that the coupling between adjacent wires occurs is high.

In an embodiment, at least one first auxiliary wire AXL may be provided between the first connection wires CL1 adjacent to each other. The first auxiliary wire AXL may extend in the first direction, may be spaced from the first connection wires CL1 adjacent thereto, and may be disposed parallel to the first connection wires CL1. According to the above description, as a shield wire for preventing the coupling between adjacent connection wires, one or more first auxiliary wires AXL may be disposed between the first connection wires CL1 connected with the sixth transistor NM6, the fifth transistor NM5, the transistor NM, the tenth transistor NM10, and the ninth transistor NM9. In an embodiment, the first auxiliary wire AXL may be biased by a constant voltage. For example, the power supply voltage Vdd or the ground voltage GND may be applied to the first auxiliary wire AXL. As the first auxiliary wire AXL is provided between the first connection wires CL1 connected with transistors, the coupling between transistors adjacent to the first connection wires CL1 and between the first connection wires CL1 adjacent to each other is minimized. For example, the coupling between the fifth transistor NM5, the sixth transistor NM6, the ninth transistor NM9, and/or the tenth transistor NM10 disposed around the sensing node SO and the first connection wire CL1 adjacent thereto may be minimized.

In the present disclosure, in addition to the auxiliary wire added to the page buffer unit, an auxiliary wire may also be added between adjacent page buffer units provided in the N-type active regions and the P-type active regions. In this case, a component for increasing the capacitance of the sensing node, that is, a second auxiliary wire being a capacitive wire may be added.

Figure 9A:
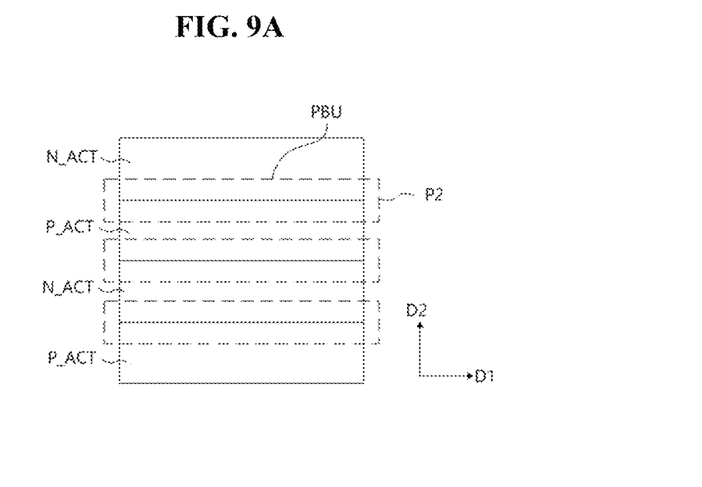
FIG. 9A is a conceptual diagram illustrating a plurality of page buffer units provided on N-type active regions and P-type active regions sequentially disposed along a second direction.
Figure 9B:
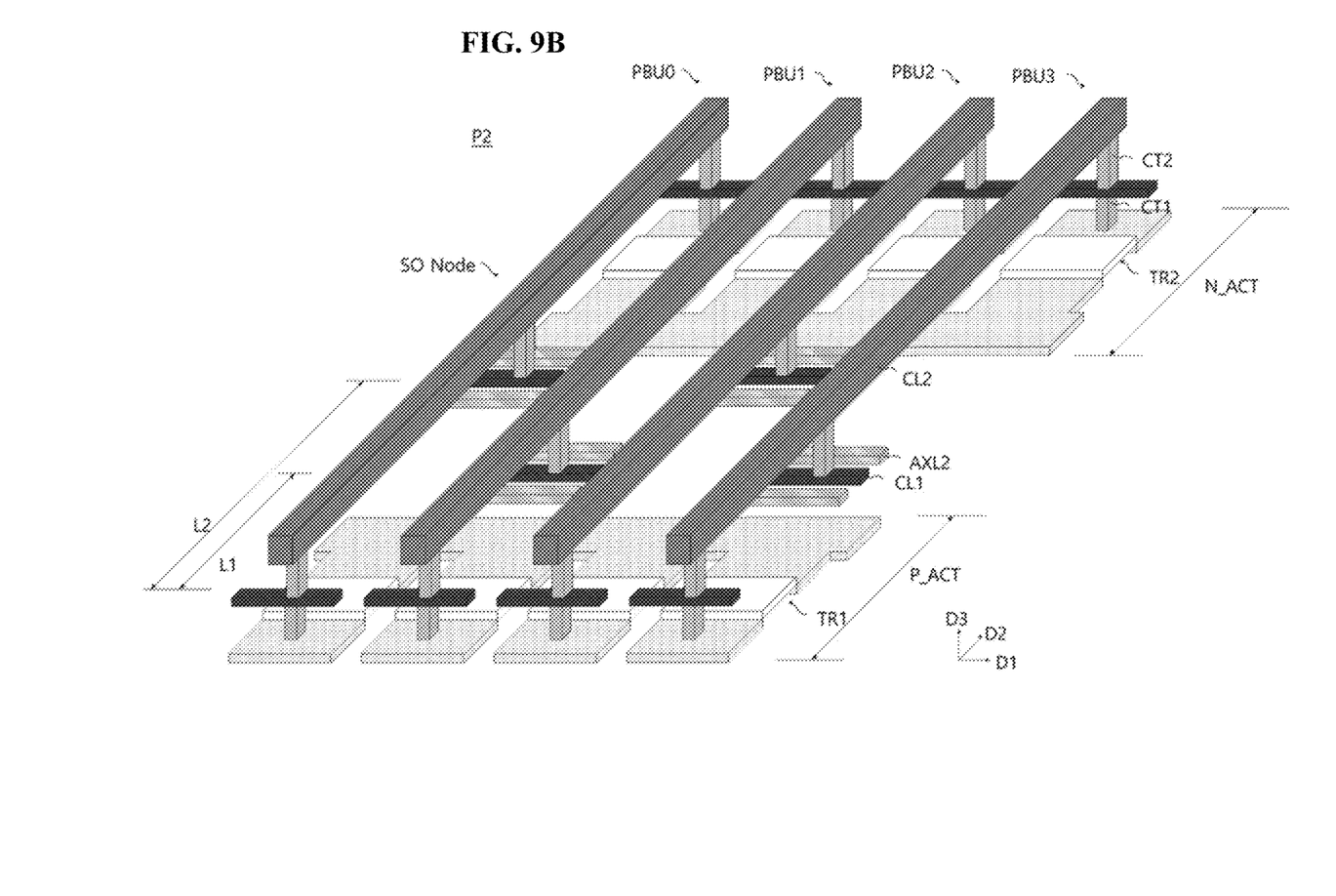
FIG. 9B is a perspective view illustrating a portion P2 of FIG. 9A.

FIG. 9A is a conceptual diagram illustrating a plurality of page buffer units provided on N-type active regions and P-type active regions sequentially disposed along a second direction, and FIG. 9B is a perspective view illustrating a portion P2 of FIG. 9A. For convenience of description, only some components are illustrated in drawing, and it is obvious that any other transistors and any other wires are further provided in addition to the illustrated components.

Referring to FIGS. 9A and 9B, an N-type active region N_ACT and a P-type active region P_ACT may extend in the first direction and may be alternately disposed along the second direction. Page buffer units PBU0, PBU1, PBU2, and PBU3 may be provided across the N-type active region N_ACT and the P-type active region PACT. In this case, each of the first to fourth page buffer units PBU0, PBU1, PBU2, and PBU3 may be provided to be elongated along the second direction and may be sequentially arranged along the first direction.

Each of the page buffer units PBU0, PBU1, PBU2, and PBU3 may include a first transistor TR1 disposed in the N-type active region N_ACT and a second transistor TR2 disposed in the P-type active region P_ACT. In each of the page buffer units PBU0, PBU1, PBU2, and PBU3, the sensing node SO is located between the first transistor TR1 and the second transistor TR2. The first transistor TR1 may include a plurality of first transistors TR1 arranged along the first direction, and the second transistor TR2 may include a plurality of second transistors TR2 arranged along the first direction. The first transistor TR1 and the second transistor TR2 corresponding to each of the second connection wires CL2 may be connected by the corresponding second connection wire CL2.

The second connection wire CL2 may be connected with a corresponding one of the first connection wires CL1 through the second contact CT2 disposed between the first and second transistors TR1 and TR2, except for contacts for the connection with the first and second transistors TR1 and TR2. In this case, the first connection wires CL1 connected with the second connection wires CL2 adjacent to each other through the second contacts CT2 different from the contacts for the connection may be disposed at different locations in the second direction.

For example, when a location where one of the second connection wires CL2 contacts the first connection wire CL1 corresponding thereto is referred to as a "first location" and a location where another of the second connection wires CL2 contacts the first connection wire CL1 corresponding thereto is referred to as a "second location", a distance of the first location from the first transistor TR1 is different from a distance of the second location from the first transistor TR1.

For example, when a distance in the second direction from the first transistor TR1 to the first location is referred to as a "first distance L1" and a distance in the second direction from the first transistor TR1 to the second location is referred to as a "second distance L2", the first distance L1 and the second distance L2 may have different values. Also, the first location and the second location may be alternately disposed along the first direction.

As such, in adjacent page buffer units, locations of the first connection wires CL1 connected with the sensing nodes SO may be disposed to be misaligned, and thus, the coupling between the sensing nodes SO may be minimized.

According to an embodiment of the present disclosure, each page buffer unit further includes a second auxiliary wire AXL2 that is provided between the first connection wire CL1 connected with the first transistor TR1/second transistor TR2 and the first connection wire CL1 disposed in the region between the first and second transistors TR1 and TR2. The second auxiliary wire AXL2 extends in the first direction and is spaced from the first connection wires CL1 that are different from each other and are adjacent to each other.

In an embodiment, the second auxiliary wire AXL2 may be provided in the same layer as the first connection wires CL1. The second auxiliary wire AXL2 may be formed independently of the first connection wires CL1; however, the second auxiliary wire AXL2 may be formed together with the first connection wires CL1 in the process of forming the first connection wires CL1, that is, in the same step/process. For example, the first connection wires CL1 and the second auxiliary wire AXL2 may be manufactured by forming a conductive layer and patterning the conductive layer; in this case, the first connection wires CL1 and the second auxiliary wire AXL2 may be patterned and formed from the same layer, that is, the conductive layer. Also, the second auxiliary wire AXL2 may be formed independently of the first auxiliary wire AXL1; however, the second auxiliary wire AXL2 may be formed together with the first auxiliary wire AXL1 in the process of forming the first auxiliary wire AXL1, that is, in the same step/process. For example, the first auxiliary wire AXL1 and the second auxiliary wire AXL2 may be manufactured by forming a conductive layer and patterning the conductive layer; in this case, the first auxiliary wire AXL1 and the second auxiliary wire AXL2 may be patterned and formed from the same layer, that is, the conductive layer.

In an embodiment, the second auxiliary wire AXL2 may be biased by a constant voltage; for example, the power supply voltage Vdd or the ground voltage GND may be applied to the second auxiliary wire AXL2.

The second auxiliary wire AXL2 corresponds to a capacitive wire for increasing the capacitance between the first transistor TR1 and the first connection wire CL1 connected with the sensing node SO and between the second transistor TR2 and the first connection wire CL1 connected with the sensing node SO.

Figure 10:
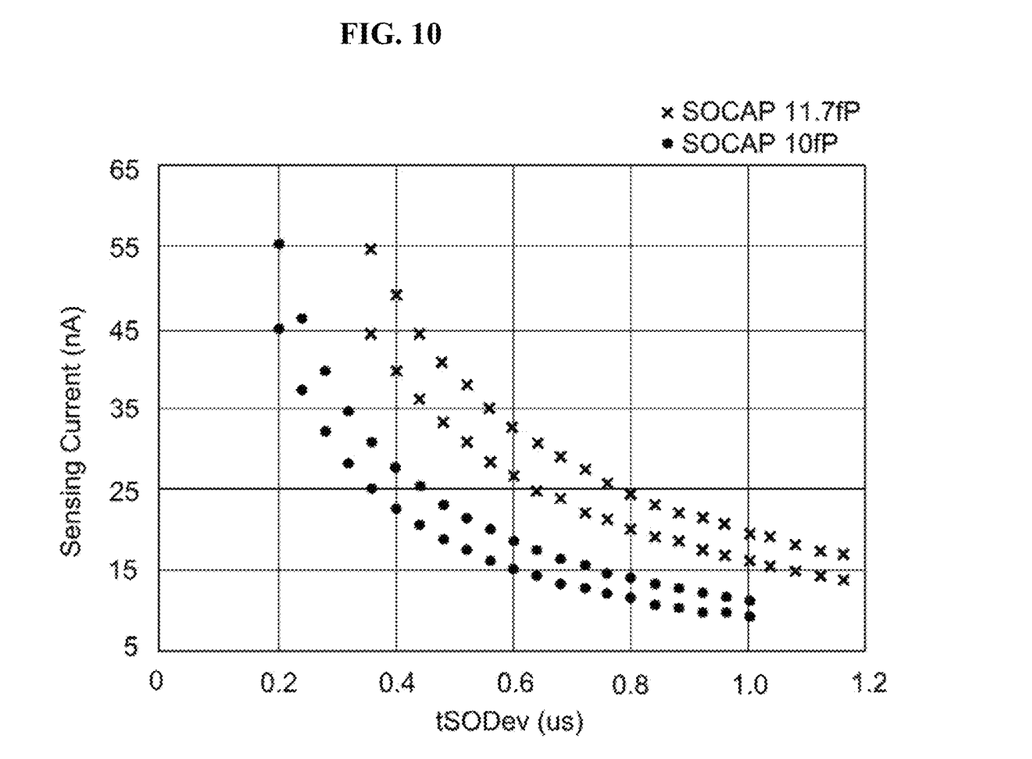
FIG. 10 is a graph illustrating a sensing current value according to a develop time of a sensing operation.

According to the present disclosure, as the second auxiliary wire AXL2 is provided, the reliability/accuracy of sensing may be secured, which will be confirmed from a graph of FIG. 10.

FIG. 10 is a graph illustrating a sensing current value according to a develop time tSODev of a sensing operation. In detail, FIG. 10 indicates an embodiment in which a second auxiliary wire is formed and an embodiment in which a second auxiliary wire is not formed and shows a graph of a sensing current value when the time tSODev of the data sensing period increases. Assuming that the remaining conditions other than the second auxiliary wire are identical, in FIG. 10, the capacitance of the sensing node when the second auxiliary wire is formed is 11.7 fP, and the capacitance of the sensing node when the second auxiliary wire is not formed is 10 fP. The sensing current values corresponding to the two cases are shown over the develop time. Here, there is a variation according to the develop time for the transistor whose sensing current is measured, and the two sensed current values represent two current values according to the same develop time.

In FIG. 10, a cell current amount is monitored during a specific time tSODev through the sensing node of the page buffer, and a signal level On/Off of a specific word line is determined through the amount of charges Q remaining in the sensing node.

Programmed cells have different cell current (Id) characteristics due to threshold voltage distributions of cells adjacent thereto. As understood from FIG. 10, in the case that a sensing capacitance is small, sensing may be difficult since a threshold voltage distribution width may increase when data are determined based on a sensing reference current. However, the second auxiliary wire as additional wiring is formed, so that he sensing capacitance is increased, resulting sensing accuracy may be increased.

According to an embodiment of the present disclosure, as a metal pattern biased by a constant voltage is disposed adjacent to a metal pattern where a sensing node is implemented, the coupling at the sensing node may be prevented. In addition, as the metal pattern biased with the constant voltage is disposed adjacent to the metal pattern where the sensing node is implemented, the capacitance of the sensing node may increase, and thus, a couple ratio with an adjacent wire(s) may decrease. Accordingly, because a voltage variation of the sensing node decreases in an operation of a memory device, the reliability of the memory device may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
a memory cell array comprising a plurality of memory cells; and
a page buffer circuit comprising a plurality of page buffer units connected to the plurality of memory cells through a plurality of bit lines,
wherein the plurality of page buffer units are connected to a plurality of sensing nodes,
wherein each page buffer unit of the plurality of page buffer units comprises at least one transistor associated with a first sensing node of the plurality of sensing nodes, and
wherein the at least one transistor comprises:
a source and a drain sequentially disposed in a second direction;
a gate electrode disposed between the source and the drain;
a plurality of first connection wires extending in a first direction, wherein at least some of the plurality of first connection wires are connected with the source, the drain, and the gate electrode through a plurality of first contacts;
a plurality of second connection wires extending in the second direction intersecting the first direction and connected with the first sensing node, wherein the plurality of second connection wires are connected with the plurality of first connection wires through a plurality of second contacts; and
a first auxiliary wire extending in the first direction and disposed between first connection wires that are adjacent to each other from among the plurality of first connection wires, wherein the first auxiliary wire is distinct from the gate electrode.

2. The memory device of claim 1, wherein the first auxiliary wire is biased by a constant voltage.

3. The memory device of claim 2, wherein a power supply voltage or a ground voltage is applied to the first auxiliary wire.

4. The memory device of claim 1, wherein the plurality of first connection wires and the first auxiliary wire are patterned and formed from a single film.

5. The memory device of claim 1, wherein the first auxiliary wire is provided in a same layer as the plurality of first connection wires.

6. The memory device of claim 1, wherein the at least one transistor comprises a first transistor and a second transistor which are connected with the first sensing node and are respectively provided in an N-type active region and a P-type active region.

7. The memory device of claim 6, wherein the first sensing node is connected between the first transistor and the second transistor.

8. The memory device of claim 7, wherein the plurality of sensing nodes comprises a second sensing node,
the first transistor and the second transistor are arranged along the second direction, and
the first transistor and the second transistor are connected to the second sensing node, and the second sensing node extends in the second direction.

9. The memory device of claim 8, wherein the each second connection wire is connected with a corresponding first connection wire among the plurality of first connection wires through a second contact of the plurality of second contacts, and the second contact is different from a first contact of the plurality of first contacts for connection of the first connection wire with the first transistor.

10. The memory device of claim 9, wherein, as the source, the gate electrode and the drain of the first transistor are arranged along the second direction, and the plurality of first connection wires extend along the first direction, the plurality of second contacts connecting to the plurality of first connection wires connected to the source, the gate and the drain of the first transistor are arranged on a diagonal between the second direction and the first direction.

11. The memory device of claim 8, further comprising:
a second auxiliary wire provided between first connection wires connected to the first transistor and the second transistor from among the plurality of first connection wires and a first connection wire connected in a region between the first transistor and the second transistor from among the plurality of first connection wires.

12. The memory device of claim 11, wherein the second auxiliary wire is biased by a constant voltage.

13. The memory device of claim 12, wherein a power supply voltage or a ground voltage is applied to the second auxiliary wire.

14. The memory device of claim 11, wherein the second auxiliary wire is provided in a same layer as the plurality of first connection wires.

15. The memory device of claim 11, wherein the plurality of first connection wires, the first auxiliary wire, and the second auxiliary wire are patterned and formed from the same film.

16. The memory device of claim 7, wherein the first transistor includes a plurality of first transistors arranged along the first direction,
wherein the second transistor includes a plurality of second transistors arranged along the first direction, and
wherein each second connection wire connects corresponding first transistor of the first transistors and corresponding second transistor of the second transistors.

17. The memory device of claim 16, wherein the each second connection wire is connected with a corresponding first connection wire among the first connection wires through another contact different from contacts for connection with the first and second transistors, and locations of the corresponding first connection wires adjacent to each other are differently determined in the second direction.

18. The memory device of claim 17, wherein locations where one part of the second connection wire are connected with the corresponding first connection wire are referred to as first locations, and locations where the other part of the second connection wire are connected with the corresponding first connection wire are referred to second locations, and
the first locations and the second locations are disposed alternately along the first direction.

19. The memory device of claim 5, wherein the first auxiliary wire is a shield wire to prevent coupling between the first connection wires and the source, the drain, and the gate electrode.

20. The memory device of claim 11, wherein the second auxiliary wire is a capacitive wire to increase capacitance between the first transistor and the first connection wire and between the second transistor and the first connection wire.

* * * * *